United States Patent [19]

Ballu

[11] Patent Number: 5,372,305
[45] Date of Patent: Dec. 13, 1994

[54] MOBILE DEVICE FOR TREATING ARBORESCENT PLANTS

[75] Inventor: Patrick J. M. Ballu, Reims, France

[73] Assignee: Nicolas Pulverisateurs, Bon Encontre, France

[21] Appl. No.: 905,138

[22] Filed: Jun. 23, 1992

Related U.S. Application Data

[63] Continuation of Ser. No. 676,454, Mar. 26, 1991, abandoned, which is a continuation of Ser. No. 385,041, Jul. 26, 1989, abandoned.

[30] Foreign Application Priority Data

Jul. 28, 1988 [FR] France ................. 88 10178

[51] Int. Cl.5 ............................................. B05B 9/06
[52] U.S. Cl. ................................................... 239/77
[58] Field of Search ................................... 239/77, 78

[56] References Cited

U.S. PATENT DOCUMENTS

| | | | |
|---|---|---|---|
| 2,952,222 | 2/1960 | Spreng | 239/77 X |
| 3,164,324 | 1/1965 | Bruinsma | 239/77 |
| 3,252,656 | 5/1966 | Greenwood | 239/77 |
| 3,655,130 | 4/1972 | Patrick | 239/77 |
| 4,026,469 | 5/1977 | Frankel et al. | 239/78 |

FOREIGN PATENT DOCUMENTS

| | | |
|---|---|---|
| 4087872 | 4/1972 | Australia . |
| 0102253 | 9/1983 | European Pat. Off. . |
| 1314453 | 12/1962 | France ................. 239/77 |
| 2153671 | 9/1971 | France . |
| 2621298A1 | 5/1976 | Germany . |
| 3531422 | 3/1987 | Germany ................. 239/77 |
| 1053802 | 11/1983 | U.S.S.R. ................. 239/77 |

*Primary Examiner*—Andres Kashnikow
*Assistant Examiner*—Kevin P. Weldon
*Attorney, Agent, or Firm*—Watson, Cole, Grindle & Watson

[57] ABSTRACT

Device for spraying a treatment liquid both toward the upper part and toward the lower part of arborescent plants, and comprising at least two separate blowers whereof one (10) is preferably fixed, in the low position, and the other (8) is adjustable in height in order to reach the tops of the plants or pass above them. Preferably, the blowers each comprise a fan driven by the power take-off of a tractor, in particular by means of a T-shaped countershaft and a telescopic transmission. The device is used for the treatment of fruit trees or of vines.

8 Claims, 1 Drawing Sheet

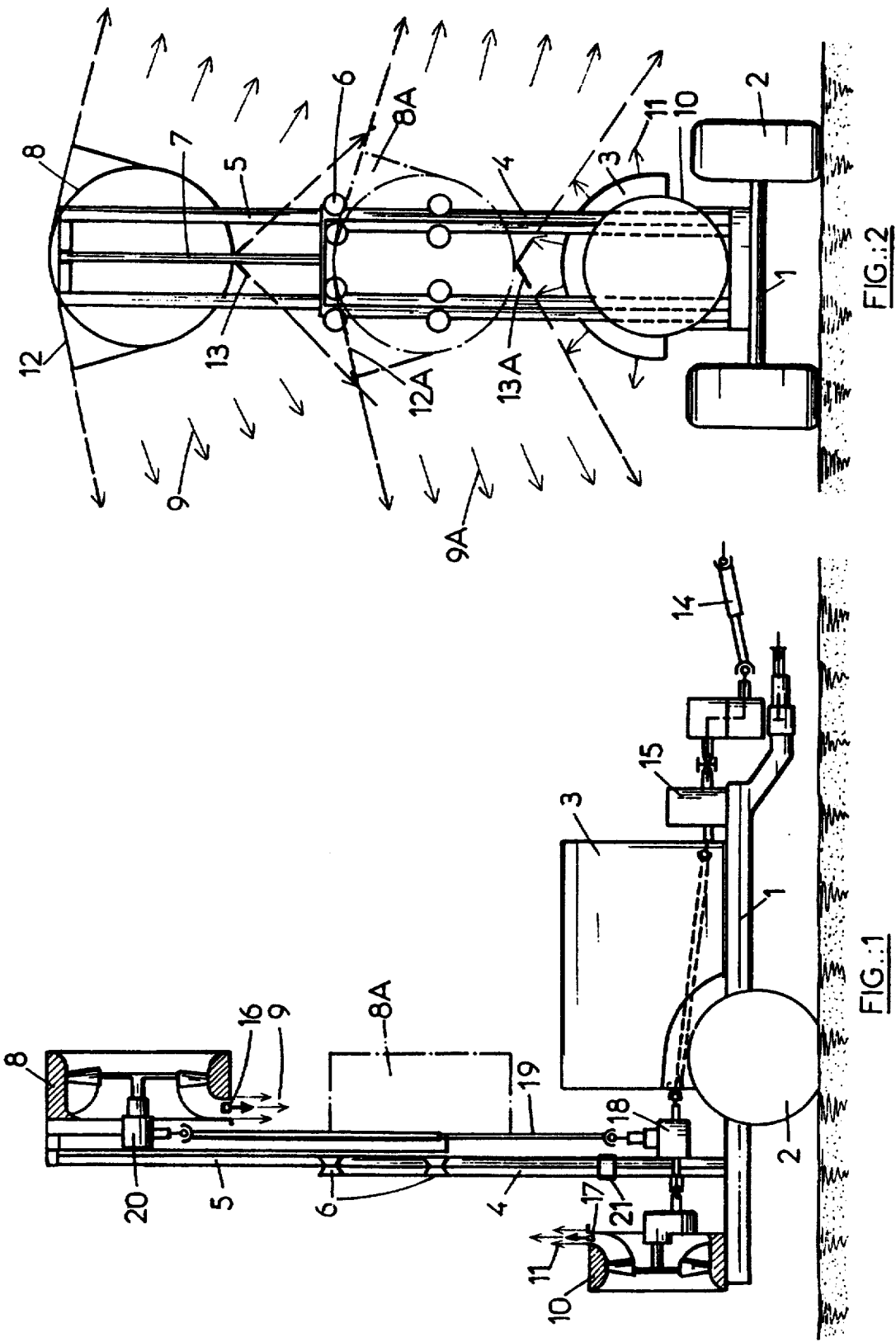

the plants, and an upper blower which can be displaced

MOBILE DEVICE FOR TREATING ARBORESCENT PLANTS

This application is a continuation of application Ser. No. 676,454, filed Mar. 26, 1991, now abandoned, which application is in turn, a continuation of application Ser. No. 385,041, filed Jul. 26, 1989, now abandoned.

FIELD OF THE INVENTION

The present invention relates to a mobile device for treating arborescent plants, such as fruit trees or vines.

BACKGROUND OF THE INVENTION

Such devices, in the current state of the art, comprise on the one hand a fan capable of creating an air flow at a relatively high speed, and on the other hand sprayers provided with nozzles capable of dispersing liquid contained in a tank and passed to the nozzles by means of a pump, these nozzles being placed in said air flow. Depending on whether it is desired to treat short plants or, by contrast, relatively tall plants, different devices are used which are capable of sending the jet either upwards or downwards. In the first case, the fan is generally placed in the low part of the device, and a pipe or a duct of suitable shape rises to a height adequate to send the air jet in the appropriate direction. The nozzles for the spraying of liquid are placed at the outlet of the air guidance ducts, whether said air is sent upwards or downwards. When it is desired to treat trees or hedges of a certain height, the device for guiding the air flow to a height similar to that of the tops of the trees contains a large-volume duct which is bulky and fragile, impedes movement and, on the other hand, entails substantial headlosses, despite its dimensions. For the treatment of shorter plants, for example vines, apparatuses exist which simultaneously deliver, from a single fan, jets directed upwards onto the lower part of the plants, and jets directed downwards onto the upper part of the same plants. It is thus possible to treat several lines of plants simultaneously. In fact, the lower air flow, passing into the zone of the trunks where the foliage is less abundant, can pass through the line and carry the product as far as the subsequent row, while the upper air flow, overhanging the tops of the rows, can itself also reach the subsequent row.

However, the apparatuses obtained in this case are extremely bulky, and their folding or dismantling for transport purposes is a delicate and time-consuming operation.

SUMMARY OF THE INVENTION

The object of the present invention is to remedy these disadvantages and to provide a device for the treatment of plants which is more effective than existing devices, while being much easier to adjust and to bring into the transport position or working position.

In order to achieve this object, the invention provides a mobile device for treating arborescent plants, such as fruit trees or vines, of the type comprising a blower capable of generating an air flow, and means for introducing into said air flow a treatment liquid which is to be sprayed, a particular feature of this device being that a single chassis carries at least two blowers, a low blower situated at a low height above the ground and capable of projecting an air jet towards the low part of the plants, and an upper blower which can be displaced between a low position, which enables the device to be moved and to pass beneath obstacles, and a high position, continuously adjustable as a function of the plants to be treated, which enables an air flow to be projected towards the upper part of the plants, nozzles for introducing the treatment liquid to be sprayed being provided at the outlet of each of the two blowers.

Preferably, each of the two blowers comprises a helical fan having an axis parallel to the direction of advance, and the two fans are driven, by means of a T-shaped countershaft, from the same power take-off, the transmission towards the upper blower being provided with means, such as a telescopic shaft, capable of compensating for the variations in height of said second blower.

The fact that two independent blowers are provided makes it possible to eliminate the piping intended to transfer the air flow from the blower, positioned in the lower part, towards ejection apertures situated in the higher part. Consequently, the invention makes it possible to obtain continuous adjustment of the height of the upper outlet point for the air flow. However, lowering the upper blower makes it possible, in a very simple manner, to obtain a vehicle which, for movement away from its points of use, possesses a reduced height and is consequently easy to manipulate.

Either or both of the blowers could have been provided with independent hydraulic or electric drive motors. The preferred solution, permitting driving via the power take-off of a tractor, requires less maintenance, and its retail price is lower.

According to an advantageous embodiment, the chassis carries a fixed vertical frame along which a mobile frame, which carries the second blower in its upper part, can move vertically, the mobile frame being able to occupy a continuous series of high positions, and at least one low position, and a telescopic transmission shaft or a plurality of telescopic transmission shafts being provided, making it possible to drive the second blower when the mobile frame is situated in the series of high positions, and means for bringing said transmission shaft, or one thereof, into action only when the mobile frame is in one of the high positions.

If the low position is only a position for moving and passing beneath obstacles, the blower is not energized when the chassis is in said low position.

If the blower is to be energized when the chassis is in the low position, a short transmission shaft will be used in lieu of the transmission shaft used for the high positions. If, in this case, the mobile frame can occupy various low positions, the short transmission shaft will be also telescopic. By this way, it is not necessary to use only one telescopic transmission shaft for a wide range of heights of the chassis.

This simple and inexpensive solution makes it possible to obtain substantial heights for the second blower, so that it can be adapted in a manner such that the air jet, in all circumstances, can pass above the tops of the trees in a row in order to reach one or more further rows situated farther from the device.

The leaves of the trees or shrubs, being simultaneously stressed in two directions by the air flows which reach them simultaneously from the low blower and from the high blower, do not tend to press against each other in the manner of roof tiles, but are shaken in a random manner, facilitating access of the treatment product to the entire surface thereof, resulting in improved efficiency of the treatment.

To avoid any risk of damaging the telescopic transmission shafts in the event of an excessive upward or downward movement, it is advantageously envisaged that stops should prevent the frame passing from one series of positions to the other series when the transmission shafts are not in the correct position. In particular, it is envisaged that, in order to bring a transmission shaft into the inactive position, it should be disconnected at a suitable point so as to be capable of adopting another position, and that its presence in this position, and that presence alone, should permit the retraction of a mechanical stop, and the passage from the series of corresponding positions to the other series of positions corresponding. Thus, all risk of damaging a transmission by an unconsidered movement of the mobile frame is eliminated.

According to another advantageous alternative embodiment, the device possesses flaps associated with the second blower in order to direct the air flow produced, and means for the remote control of the position of the flaps.

The operator can thus, as desired, adapt both the height and the width of the air flows to the nature of the plants which he is to treat.

BRIEF DESCRIPTION OF THE DRAWINGS

The invention will now be explained in a more detailed manner by means of a practical, non-limiting example, illustrated by the drawings, wherein:

FIG. 1 is a diagrammatic side view of a device according to the invention, and

FIG. 2 is a view from the rear of the device of FIG. 1.

DETAILED DESCRIPTION OF THE INVENTION

The device described in the figures comprises a supporting chassis 1, equipped with wheels 2, and supporting a treatment liquid tank 3. A vertical frame 4, comprising two square-section uprights arranged with their faces at 45° to the direction of travel, carries a mobile frame 5 which can be displaced along the fixed frame 4 by virtue of biconical rollers 6. A jack 7 undertakes the raising and lowering of the mobile frame. The mobile frame carries an upper blower 8, whose axis is parallel to the direction of travel. In the figure, the blower has been shown with an axial forward-facing intake, on the right in FIG. 1, and the lateral air output in accordance with the arrows 9. Advantageously, the blower 8 is of the type described in the document FR-A-2,153,671, in the name of the applicant company.

Evidently, the shape of the uprights can vary, and the rollers may be cylindrical or replaced by guide shoes. The jack, for its part, may also be replaced by an equivalent device, for example a cable device.

The chassis 1 further carries, towards the rear, a low blower 10 which is advantageously of the same type as the blower 8, and projects air laterally and upwards, in accordance with the arrows 11.

The arrangement of the blowers 8 and 10, with radial or lateral forward or rearward induction, is not necessarily that which is shown. In practice, it is necessary to reconcile the requirements of non-recycling into one blower of products coming from the other blower, and on the other hand to obtain, for the upper blower, the lowest possible low position with a view to lowering the center of gravity for transport purposes. The length of the chassis, the height of the tank, and the position of the frame 4 relative to the tank and the blower 10 are all factors making it possible to give preference to one or another solution while remaining within the scope of the invention.

Deflector flaps 12–13 are situated in the vicinity of the air outlets of the upper blower 8. They make it possible to direct the air flow in the desired direction, that is to say neither upwards, where the product would be wasted, nor downwards, where it would fall back towards the tank.

In the figures, the highest position of the blower 8 has been shown in solid lines, and a quite low position 8A of the same upper blower has been shown in broken lines. In this quite low position, it can be seen that the flaps 12A and particularly 13A have a different orientation. For a more suitable orientation of the air flow, the arrows 9A in FIG. 2 show, in fact, that when the blower 8A is lower the air flow must approach an orientable mean direction.

The reference 14 designates a mechanical transmission shaft connected to the power take-off of the tractor (not shown). The transmission shaft is connected to a piston pump 15, which extracts the treatment liquid from the reservoir 3 and sends it to nozzles 16–17 arranged at the outlet of the blowers 8 and 10. These nozzles, arranged in an arc around each of the blowers, are fed by rigid or flexible ducts (not shown) which connect them to the pump 15. The transmission shaft 14 likewise drives the fans of the blowers 8 and 10, via a T-shaped countershaft 18. A telescopic transmission 19 is placed between the T-shaped countershaft 18 and a multiplying gear 20 situated at the end of the shaft of the fan of the blower 8 in order to drive it. A movable stop 21 prevents the mobile frame 5 from passing from the high positions to the low positions when the transmission 19 is coupled with the countershaft and the gear.

In an alternative embodiment (not shown), the transmission 19 can be uncoupled from the countershaft 18 and placed in an appropriate housing. When it is in the housing, it displaces a locking piece which makes it possible to lower the mobile frame 5 until the blower is in the transport position, just above the tank 3, without risking damage to the transmission or the countershaft 18.

A person skilled in the art will easily understand that it is possible to substitute transmissions with different heights in the embodiment discussed above.

I claim:

1. A mobile device for treating arborescent plants, such as fruit trees or vines, comprising:
    a chassis;
    an upper and a lower blower carried by said chassis at different heights, each of the blowers comprising a helical fan able to project a flow of air in a direction which is initially parallel to a direction of advance of the device and is further deflected into a transverse direction;
    nozzles disposed at the outlet of each of the blowers and capable of spraying a treatment liquid into the air flows generated by the blowers;
    a vertically arranged telescopic transmission shaft to drive said upper blower; and
    a T-shaped countershaft connected to a power source for powering both blowers;
    wherein said chassis carries a fixed vertical frame along which a movable frame can move vertically, said vertically movable frame having an upper part in which the upper blower is carried, said vertically movable frame being able to occupy a continuous series of high positions and being continuously adjustable as a function of the shape of the plants to be treated thus enabling an airflow to be projected towards an upper part of the plant, said telescopic transmission shaft being connected to said countershaft to drive said upper blower when the vertically movable frame is in one of said series of high positions, said vertically movable also being able to occupy at least one low position enabling the device to pass beneath obstacles, said telescopic transmission shaft being disconnectable from said countershaft so as not to drive said upper blower when the vertically movable frame is in said low position while the lower blower remains driven.

2. The mobile device of claim 1, wherein a lower blower is fixed, carried by the chassis at a low height above the ground and capable of projecting an air-flow towards the low part of the plants.

3. The device as claimed in claim 1, wherein a stop prevents the mobile frame passing from the series of high positions to the low position when the transmission shaft is not in the correct position.

4. The mobile device of claim 1, wherein the mobile frame is able to occupy a continuous series of high positions and a continuous series of low positions and there is provided different telescopic transmission shafts, one of them is used for high positions and another is used for low positions.

5. The mobile device of claim 4, wherein stops prevent the mobile frame passing from one series of high positions to another series of low positions when the transmission shafts are not in the correct position.

6. The mobile device of claim 1, which further comprises flaps associated with the second blower in order to direct the air flow produced, and means for the remote control of the position of these flaps.

7. The mobile device of claim 1, wherein said transmission shaft can be disconnectable from said countershaft so as not drive said upper blower while the lower blower remains driven.

8. The mobile device according to claim 1, wherein said higher blower provides an outlet for spraying said treatment liquid in a downward direction and a lower blower provides an outlet for spraying said treatment liquid in an upward direction.

* * * * *